United States Patent
Yang et al.

(10) Patent No.: US 9,288,650 B2
(45) Date of Patent: Mar. 15, 2016

(54) METHOD, DEVICE AND RECORDING MEDIA FOR SEARCHING TARGET CLIENTS

(71) Applicant: INSTITUTE FOR INFORMATION INDUSTRY, Taipei (TW)

(72) Inventors: Ping-Che Yang, Kaohsiung (TW); Tsun Ku, Taipei (TW); Wen-Tai Hsieh, Taipei (TW); Hung-Sheng Chiu, New Taipei (TW); Ren-Dar Yang, Hsinchu (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 270 days.

(21) Appl. No.: 13/913,917

(22) Filed: Jun. 10, 2013

(65) Prior Publication Data

US 2014/0136618 A1    May 15, 2014

(30) Foreign Application Priority Data

Nov. 13, 2012 (TW) .............................. 101142142 A (51) Int. Cl.
  *G06F 15/16*      (2006.01)
  *H04W 4/20*       (2009.01)
  *H04W 4/02*       (2009.01)
  *G06Q 30/02*      (2012.01)

(52) U.S. Cl.
  CPC .......... *H04W 4/206* (2013.01); *G06Q 30/0205* (2013.01); *H04W 4/021* (2013.01)

(58) Field of Classification Search
  CPC ................... G06F 17/30861; G06F 17/30864; G06Q 50/01; H04L 67/306
  USPC ......... 709/203, 204, 205, 217, 219, 231, 232, 709/238
  See application file for complete search history.

(56) References Cited

U.S. PATENT DOCUMENTS

| | | | |
|---|---|---|---|
| 6,638,442 B1 * | 10/2003 | Nakanishi et al. | 252/62.51 R |
| 8,208,943 B2 | 6/2012 | Petersen et al. | |
| 8,209,338 B2 | 6/2012 | Wallace et al. | |
| 2007/0218900 A1 * | 9/2007 | Abhyanker | 455/435.1 |
| 2009/0204454 A1 | 8/2009 | Lagudi | |
| 2010/0281052 A1 * | 11/2010 | Geelen | 709/206 |
| 2010/0318535 A1 * | 12/2010 | Weber et al. | 707/759 |
| 2011/0208822 A1 * | 8/2011 | Rathod | 709/206 |

FOREIGN PATENT DOCUMENTS

| | | |
|---|---|---|
| CN | 1619540 A | 5/2005 |
| KR | 10-2009-0003529 | 1/2009 |
| KR | 10-2011-0102125 | 9/2011 |

* cited by examiner

*Primary Examiner* — Liangche A Wang
*Assistant Examiner* — Ayele Woldemariam
(74) *Attorney, Agent, or Firm* — Birch, Stewart, Kolasch & Birch, LLP (57) ABSTRACT

A method for searching target clients, applied to a mobile device coupled to a network, is provided. A target position and a target time are generated by a positioning unit and a time generating unit of the mobile device, respectively. A target clients search message is generated according to keywords input into the mobile device, the target position and the target time and then transmitted to a server coupled to the network through the network. Then a search result transmitted by the server through the network is received. The search result comprises at least one of a target clients amount, a target clients density and a target clients occurrence probability, which are retrieved from at least one social networks data and corresponding to the keywords, the target location and the target time. A map combined with the search result is displayed.

10 Claims, 4 Drawing Sheets

METHOD, DEVICE AND RECORDING MEDIA FOR SEARCHING TARGET CLIENTS

CROSS REFERENCE TO RELATED APPLICATIONS

This Application claims priority of Taiwan Patent Application No. 101142142, filed on Nov. 13, 2012, the entirety of which is incorporated by reference herein.

BACKGROUND OF THE INVENTION

1. Field of the Invention

The invention relates to the technology of searching target clients which is applied to a mobile device and more particularly to technologies of searching target clients according to social networking information, combining search results (such as an amount, a density or an occurrence probability of the target clients) into a map and displaying the map.

2. Description of the Related Art

Leafleting or holding an advertisement board by a marketing person at a certain location is common in typical marketing methods. For example, real estate agent often hold advertisement boards at sides of traffic intersections, or promoter for restaurant often hand out leaflets at downtown areas. However, targets of the marketing methods described above are chosen randomly. A marketing person may chose a location based upon his/her experiences or a location having large 'foot' traffic. Therefore, target clients that the marketing person looks for may not be found. Furthermore, the marketing person may have no idea when or where the target clients appear. In addition, when the marketing person arrives at a location, the information, such as possible target clients reached, target clients density or target clients occurrence probability corresponding to times and locations cannot be obtained for the marketing person in time. Accordingly, the opportunity cost of marketing is high and efficiency is poor.

In view of the rapid development of mobile devices and the widely used social networking services, the invention provides a method and a device for searching target clients so as to allow a user to search target clients and related information according to times and locations. The target clients and the related information are provided to the marketing person, and thus, marketing efficiency can be improved

BRIEF SUMMARY OF THE INVENTION

The invention provides a method for searching target clients, applied to a mobile device coupled to a network, comprising: inputting at least one keyword; generating a target position by a positioning unit of the mobile device; generating a target time by a time generating unit of the mobile device; generating a target clients search message according to the at least one keyword, the target position and the target time, and transmitting the target clients search message to a server coupled to the network through the network; receiving a search result transmitted by the server through the network, wherein the search result comprises at least one of a target clients amount, a target clients density and a target clients occurrence probability, which are retrieved from at least one social networks data and corresponding to the at least one keyword, the target location and the target time; and displaying a map combined with the search result.

Another embodiment of the invention provides a device for searching target clients comprising: a communication unit, coupled to a network; an input unit, where at least one keyword is input; a positioning unit, generating a target position; a time generating unit, generating a target time; and a processing unit, coupled to the communication unit, the input unit, the positioning unit and the time generating unit, generating a target clients search message according to the at least one keyword, the target position and the target time, transmitting the target clients search message to a server through the communication unit, and receiving a search result transmitted by the server through the communication unit, wherein the search result comprises at least one of a target clients amount, a target clients density and a target clients occurrence probability, which are retrieved from at least one social networks data and corresponding to the at least one keyword, the target location and the target time; and a display unit, coupled to the processing unit and displaying a map combined with the search result.

Still another embodiment of the invention provides a recording record, storing program codes, wherein an electronic device obtains at least one keyword, a target location and a target time and loads and executes the program codes to perform a method for searching target clients, and the program codes comprises: a first program code for generating a target clients search message according to the at least one keyword, the target position and the target time, and generating a search result according to the target clients search message, wherein the search result comprises at least one of a target clients amount, a target clients density and a target clients occurrence probability, which are retrieved from at least one social networks data and corresponding to the at least one keyword, the target location and the target time; and a second program code for displaying a map combined with the search result.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
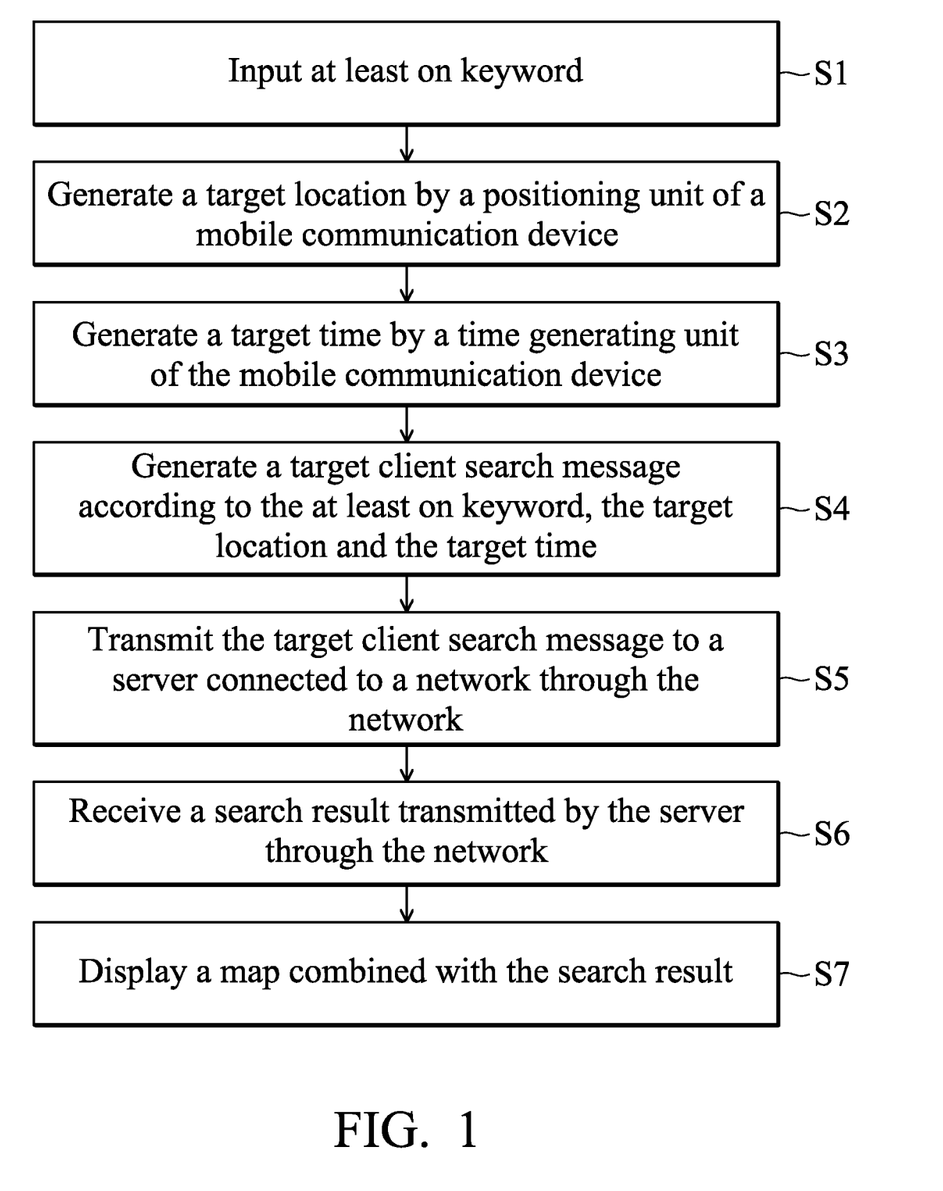
FIG. 1 is a flow chart of a method for searching target clients applied to a mobile device according to an embodiment of the invention.

FIG. 1 is a flowchart of a method for searching target clients applied to a mobile device, such as a smart phone, a tablet, a laptop, a personal digital assistant (PDA), or any other portable electronic device capable of connecting networks, according to an embodiment of the invention. Firstly, in step S1, at least one keyword is input. Then in step S2, a positioning unit of the mobile device generates a target location. For example, the positioning unit can be a GPS (Global Positioning System) unit, a WPS (Wi-Fi Positioning System)

unit or an electronic compass. The WPS unit gets a geographic location of a mobile phone by a mobile phone base station or a wireless network base station Wi-Fi AP (Access Point) which is at a fixed location and communicates with the mobile phone. When steps of the method begin (for example, after the step S1 for inputting the at least one keyword), the mobile device obtains a current location of the mobile device from the positioning unit (such as the GPS unit) and the current location (such as in a form of GPS coordinates) is taken as the target location. Moreover, the positioning unit can also be a user interface receiving location information input by a user, and the location information is taken as the target location. In step S3, the time generating unit of the mobile device generates a target time, such as 3 o'clock in the afternoon. The time generating unit can be a built-in clock or timer of the mobile device. The time generating unit can also be an external (such as in a server) clock or timer connected to the mobile device through a communication unit and networks. When steps of the method begin (for example, after the step S1 or S2 for inputting the at least one keyword or generating the target location), the mobile device takes current generated time of the time generating unit (such as the built-in clock) as the target time. Furthermore, the time generating unit can be a user interface receiving time information input by the user, and the time information is taken as the target time. For avoiding confusion, in the embodiments of the description, "time" indicates a certain time point presented with hour, minute and second in one day, and "date" indicates a certain day presented with date, month and year.

Then, in step S4, the mobile device generates a target clients search message according to the at least one keyword, the target location and the target time. In other words, the target clients search message includes information of the at least one keyword, the target location, the target time and so on. In step S5, the mobile device transmits the target clients search message to a server through a network. In step S6, the mobile device receives a search result from the server through the network. The search result may include a target clients amount, a target clients density or a target clients occurrence probability retrieved from at least one social networks data and corresponding to the at least one keyword, the target location and the target time. In step S7, a map, such as an electronic map, combined with the search result is displayed on the mobile device. Information of the target clients amount, the target clients density and/or the target clients occurrence probabilities, etc. can be displayed in the form of text, various colors, figures, a dasymetric map, a choropleth map, and so on in the map.

In some embodiments, steps performed by the server for generating the search result will be described in the following. The server may obtain the at least one keyword, the target location and the target time from the target clients search message transmitted by the mobile device and generate a location range for the target location and a time range for the target time. Generally speaking, the time range comprises the target time and the location range comprises the target location. Then the server may retrieve a plurality of potential clients corresponding to the location range and the time range from the at least one social networks data and counts the amount of the plurality of potential clients so as to obtain a potential clients amount. Afterward, the server can compare the data corresponding to the potential clients in the at least one social networks data (such as data that the potential clients have published on their own pages or/and other people's pages in social networking platforms, personal information that the potential clients have provided, and so on) with the at least one keyword so as to retrieve a plurality of target clients corresponding to the at least one keyword from the plurality of potential clients. For example, the potential clients whose published data on the social networking platforms may comprise the at least one keyword, synonymous words of the at least one keyword or associated words of at least one keyword may be determined as the target clients. Possibly, the potential clients whose personal information may comprise the at least one keyword, synonymous words of the at least one keyword or associated words of at least one keyword may be determined as the target clients. After that, the amount of the retrieved plurality of target clients is counted so as to obtain the target clients amount. The server calculates the target clients density according to the target clients amount and the potential clients amount, and calculates the target clients occurrence probability according to data corresponding to the plurality of target clients in the at least one social networks data, the time range and the location range. Then, the calculated target clients amount, target clients density and target clients occurrence probability are taken as the search result and the search result is transmitted to the mobile device.

In some embodiments, social networks data can be stored in a social networks database. The social networks data can be public data of users of the social networking platforms, which is retrieved by the server connected to the social networking platforms (such as Facebook) or retrieved from other databases. For example, the server may utilize a web crawler to retrieve public data of users from the Facebook social networking platform and then stores the retrieved data into the social networks database. The retrieved data may include names of the users of the social networking platform, check-in information (such as check-in location and check-in time), interests of the users, preferences, subscribed messages for people/activities/objects, posts on walls, shared links, and so on. The server can be set to retrieve data within a date range (such as within 300 days). In addition, the server may update the social networks database according to a predefined frequency.

In another embodiment, a specific way to generate the search result by the server is described in the following. First, the server retrieves social networks data corresponding to the location range and the time range from social networks data of the social networks database according to the location range and the time range of the target location. Users corresponding to the retrieved social networks data are taken as potential clients and are listed in a potential clients list. For example, the location range is a circular region centered at the target location with a 10-km radius, and the time range is a period of time from one hour before the target time to two hours after the target time. For example, if the time when a user entered at least one keyword through the mobile device is 11 o'clock in the morning and the location where the user entered the at least one keyword is Taipei station, the time range is from 10 o'clock in the morning to 1 o'clock in the afternoon and the location range is a circular region centered at Taipei station with a 10-km radius. Note that the described values, such as 10 km, one hour before the target time, two hours after the target time, and so on, are only exemplary and the invention is not limited thereto. The server may define the size of the location range and the length of the time range according to predefined values. The location range and the time range can also be adaptively adjusted by the user through the mobile device (such as through an operating interface) and are then transmitted to the server so as to adjust the size of the location range and the length of the time range.

When the server stores the retrieved social networks data in the social networks database, the social networks data can be expressed with a coordinate space, wherein each of coordinate axes of the coordinate space corresponds to one of fields of the database for the social networks data, respectively. For example, the retrieved social networks data can be expressed with a coordinate space formed by a time axis and a location axis according to published time and location of each of social networks data (such as check-in data). Therefore, when the server retrieves the potential clients, retrieved social networks data in the coordinate space, which has the location in the location range and the published time in the time range, can be determine. The users of the social networking services corresponding to the determined data can be the potential clients. In one embodiment, an X-axis of the coordinate space refers to the longitude of the published location of data, a Y-axis of the coordinate space refers to the latitude of the published location of data, and a Z-axis of the coordinate space refers to the published time of data. The longitude and the latitude of the location where the at least one keyword is input by a device are lo° and la° respectively, and the time when the at least one keyword is input by the device is t (such as at 10 o'clock). The location range can be [(lo±0.01)°, (la±0.01)°], and the time range can be t±1, then data whose coordinate (x, y, z) is within (lo±0.01, la±0.01, t±1) is determined in the location range and the time range. After that, users in the social networking services that correspond to the fit data form the potential clients lists.

Then, the server compares data corresponding to the potential clients in the social networks data with the at least one keyword to retrieve the target clients that correspond to the at least one keyword from the potential clients, and thus a target clients list is generated. For example, the potential clients list includes a potential client A. If there is any record of all social networks data of the potential client A tallying with the at least one keyword after the keyword comparison is performed, the potential client A is to be determined as a target client. On the other hand, if there is no record of all social networks data of the potential client A tallying with the at least one keyword after the keyword comparison is performed, the potential client A is not to be determined as a target client. Note that, in the embodiment, the keyword itself can be taken as the basic string for the comparison. Furthermore, an expansion of the keyword can also be used for the comparison.

Then, the server calculates the target clients amount according to the target clients list and calculates the potential clients amount according to the potential clients list. After that, the server calculates the target clients density according to the following equation:

$$D = \frac{N_T}{N_P},$$

wherein D is the target clients density, $N_T$ is the target clients amount, and $N_P$ is the potential clients amount. For example, if the potential clients list comprises 100 people and the target clients list comprises 70 people, the target clients density is 70%.

Then, the server calculates the target clients occurrence probability according to data corresponding to all the target clients in the social networks data, the location range and the time range. The target clients occurrence probability can be calculated according to the following equation:

$$P = \frac{\sum_{i=1}^{N_T} \frac{N(i, t, l)}{N(i, t)}}{N_T},$$

wherein P is the target clients occurrence probability, $N_T$ is the target clients amount, $N(i, t, l)$ is the amount of social networks data corresponding to a target client i of the target clients, a time range t and a location range l, $N(i, t)$ is the amount of social networks data corresponding to the target client i and the time range t. For example, if the user enters at least one keyword at 3 o'clock in the afternoon at Taipei station and the predefined time range is within one hour before and after the input time and the predefined location range is a circular region centered at the input location with a 100-m radius, then the time range is from two o'clock in the afternoon to four o'clock in the afternoon and the location range is a circular region centered at Taipei station with a 100-m radius. After analyzing the social networks data corresponding to a target client B in the target clients list, the number of times of the published check-in data for the target client B is 40 times from two o'clock in the afternoon to four o'clock in the afternoon in the recent 100 days, and is 30 times from two o'clock in the afternoon to four o'clock in the afternoon in the recent 100 days within the circular region centered at Taipei station with 100-m radius. Therefore, an occurrence probability of the target client B is 75% (30/40). Furthermore, a mean value of the occurrence probabilities of all target clients in the target clients list is the target clients occurrence probability.

In addition, the search result may further comprise a common topic of the target clients. The server uses the topic detection to calculate the common topic of all the target clients according to data corresponding to all the target clients in the social networks data. The common topic may comprise more than one topic. For example, according to social networks data of all the target clients, if more than 90% of all the target clients has social networks data related to the topic of pets, then the common topic of the target clients is "pets". The common topic can be directly displayed on the mobile device or can be combined into the map and then displayed. Note that the 90% is only exemplary, and the invention is not limited thereto.

In another embodiment, the search result may further comprise contact information of some target clients that are willing to provide their contact information in public in the target clients list. Therefore, the contact information can be displayed on the mobile device, and thus the user may contact with the target clients according to the contact information. Whether a target client is willing to provide his/her contact information in public is determined according to his/her settings in the social networking services. The contact information can be directly displayed on the mobile device or can be combined into the map and then displayed.

Figure 3:
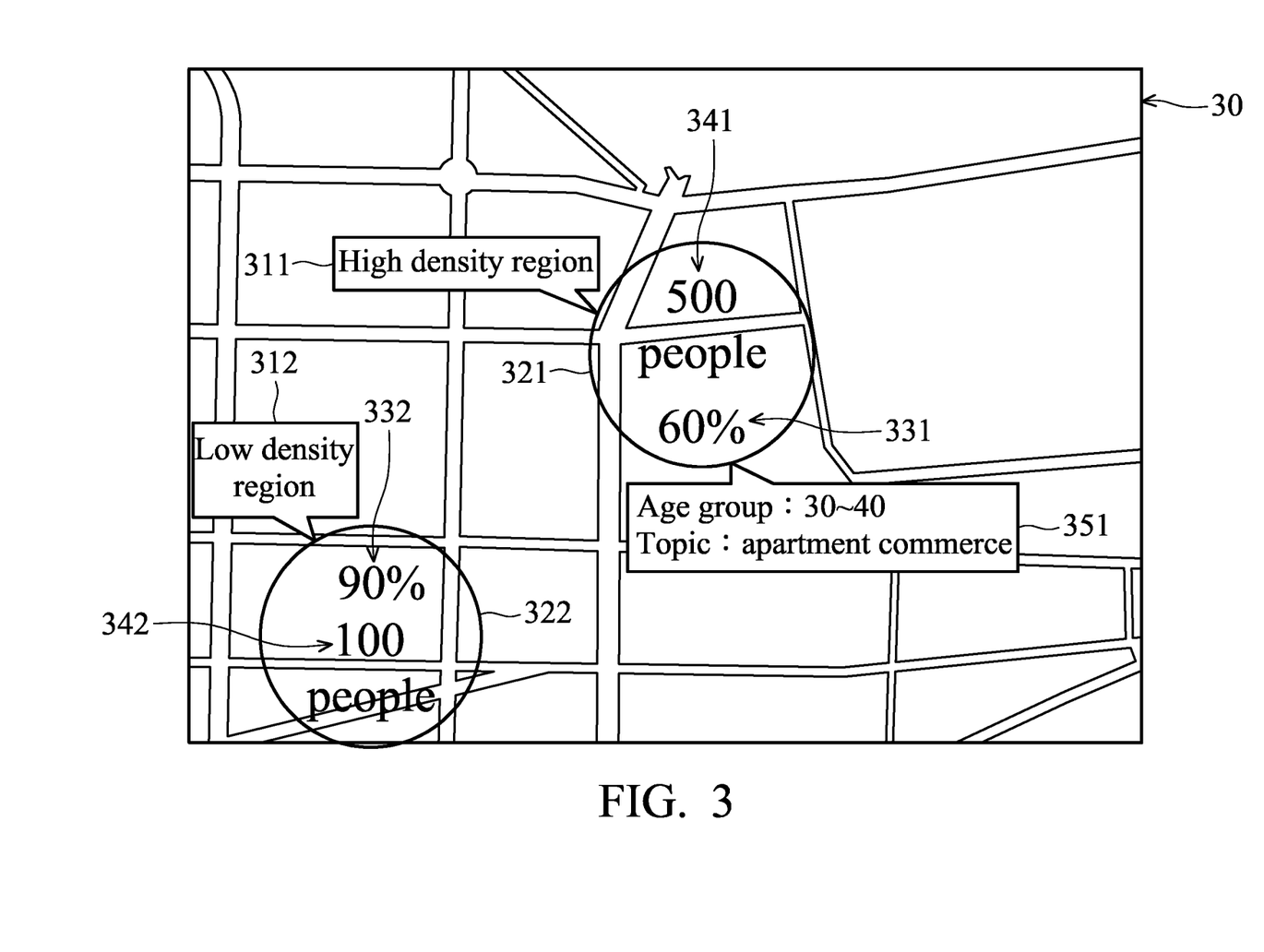
FIG. 3 is a block diagram of a map combined with a search result of target clients according an embodiment of the invention.

FIG. 3 is a block diagram of a map 30 combined with a search result of target clients according an embodiment of the invention. In the map 30, a region 321 is tagged by a target clients amount tag 341, a target clients density tag 311, a target clients occurrence probability tag 331 and a common topic tag 351. According to the combined-into-map tags in FIG. 3, for the region 321, the target clients amount is 500 people, the target clients density is high, the target clients occurrence probability is 60%, the target clients common topic is apartment commerce, and ages of the target clients are 30~40 years old. Similarly, according to a target clients amount tag 342, a target clients density tag 312 and a target clients occurrence probability tag 332, for the region 322, the target clients amount is 100 people, the target clients density is low, and the target clients occurrence probability is 90%. In view of the above, the user can choose a region where he/she is going to leaflet or perform other marketing activities according to the information on the map 30. In the embodiment shown in FIG. 3, the target clients density indicates high-density or low-density. For example, if a target clients density is higher than 50%, the target clients density is high-density, otherwise it is low-density. In another embodiment, values of target clients densities may be directly displayed at some certain location on the map. Furthermore, in another embodiment, information of the search result of target clients may not be entirely combined into the map. For example, any one or any combination of the target clients amount, the target clients density, the target clients occurrence probability and the target clients common topic can be combined into the map and then displayed. In another embodiment, sizes of the target clients amount tag, the target clients density tag and the target clients occurrence probability tag may vary with the magnitude. For example, if a target clients occurrence probability is higher than 80%, the size of the target clients occurrence probability tag is a first size, otherwise it is a second size, wherein the first size is larger than the second size. Moreover, though regions in FIG. 3 are shown by circular frames, circular frames of regions and forms of all tags are only exemplary, and the invention is not limited thereto. For example, different regions in the map may be shown by different colors or different textures, respectively.

Figure 2A:
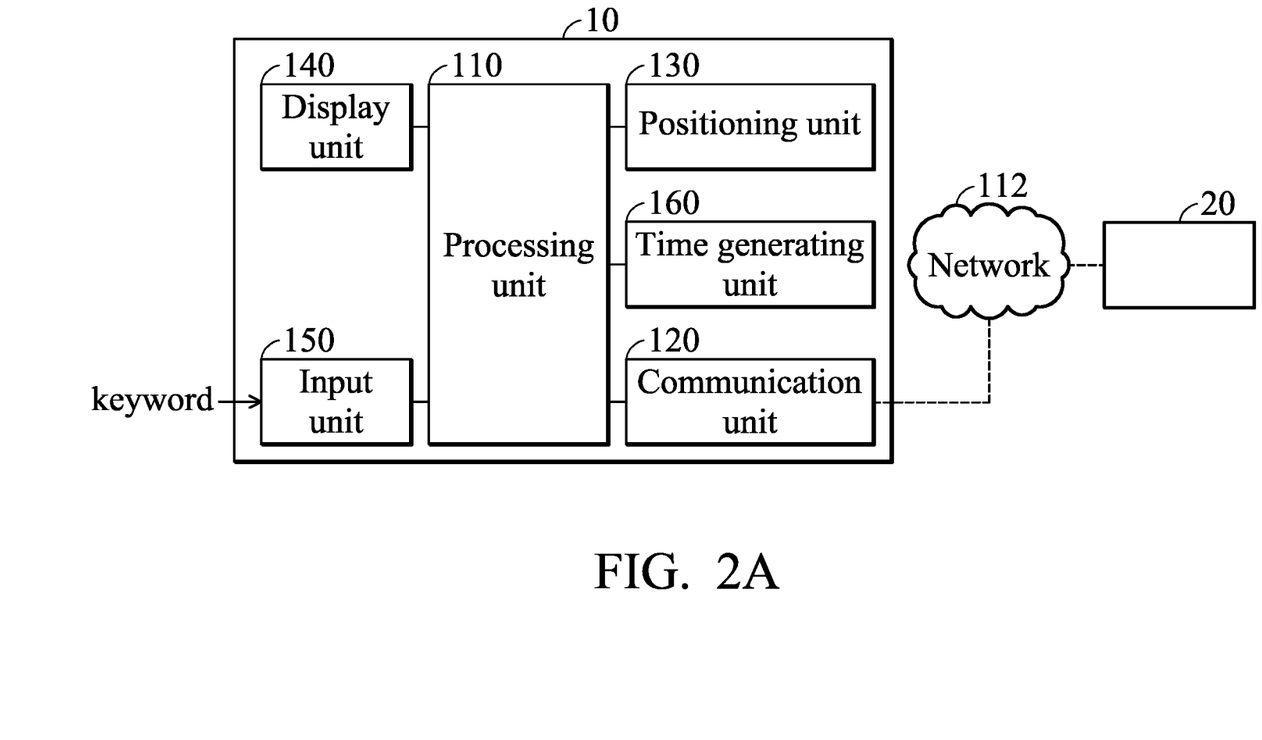
FIG. 2A is a block diagram of device for searching target clients according to an embodiment of the invention.

FIG. 2A is a device 10 for searching target clients according to an embodiment of the invention. The device 10 (also called as the user end 10) can be a smart phone, a tablet, a laptop, a personal digital assistant (PDA), or any other portable electronic device capable of connecting networks. The device 10 comprises a processing unit 110, a communication unit 120, a positioning unit 130, a display unit (such as a screen) 140, an input unit 150 and a time generating unit 160. The communication unit 120 is coupled to a network 112. A user inputs at least one keyword through the input unit 150. The positioning unit 130 generates a target location, and the time generating unit 160 generates a target time. The positioning unit 130 can be a GPS unit, a WPS unit or an electronic compass. When steps of the method begin (for example, when inputting the at least one keyword in step S1), the positioning unit 130 (such as the GPS unit) obtains a current location of the user end 10 and the current location is taken as the target location (such as in a form of GPS coordinates). Moreover, the positioning unit 130 can also be a user interface receiving location information input by the user, and the location information is taken as the target location. The time generating unit 160 can be a built-in clock or timer of the device 10. The time generating unit 160 can also be an external (such as in a server end) clock or timer connected to the device 10 through the communication unit 120 and the network 12. When steps of the method begin (for example, after the step S1 or S2 for inputting the at least one keyword or generating the target location), the time generating unit 160 takes its current generated time as the target time. Furthermore, the time generating unit 160 can be a user interface receiving time information input by the user, and the time information is taken as the target time.

The processing unit 110 receives the at least one keyword, the target location and the target time and generates a target clients search message. In other words, the target clients search message includes information of the at least one keyword, the target location, the target time and so on. Then, the processing unit 110 transmits the target clients search message to a server end 20 through the communication unit 120 and the network 112. After that, the processing unit 110 receives a search result from the server end 20 through the network 112 and the communication unit 120. The search result may include a target clients amount, a target clients density or a target clients occurrence probability retrieved from at least one social networks data and corresponding to the at least one keyword, the target location and the target time. The processing unit 110 transmits the search result to the display unit 140, and the display unit 140 displays a map, such as an electronic map, combined with the search result, for example, the map 30 in FIG. 3. Information of the target clients amount, the target clients density and/or the target clients occurrence probability, etc. can be displayed in the form of text, various colors, figures, a dasymetric map, a choropleth map, and so on in the map.

Figure 2B:
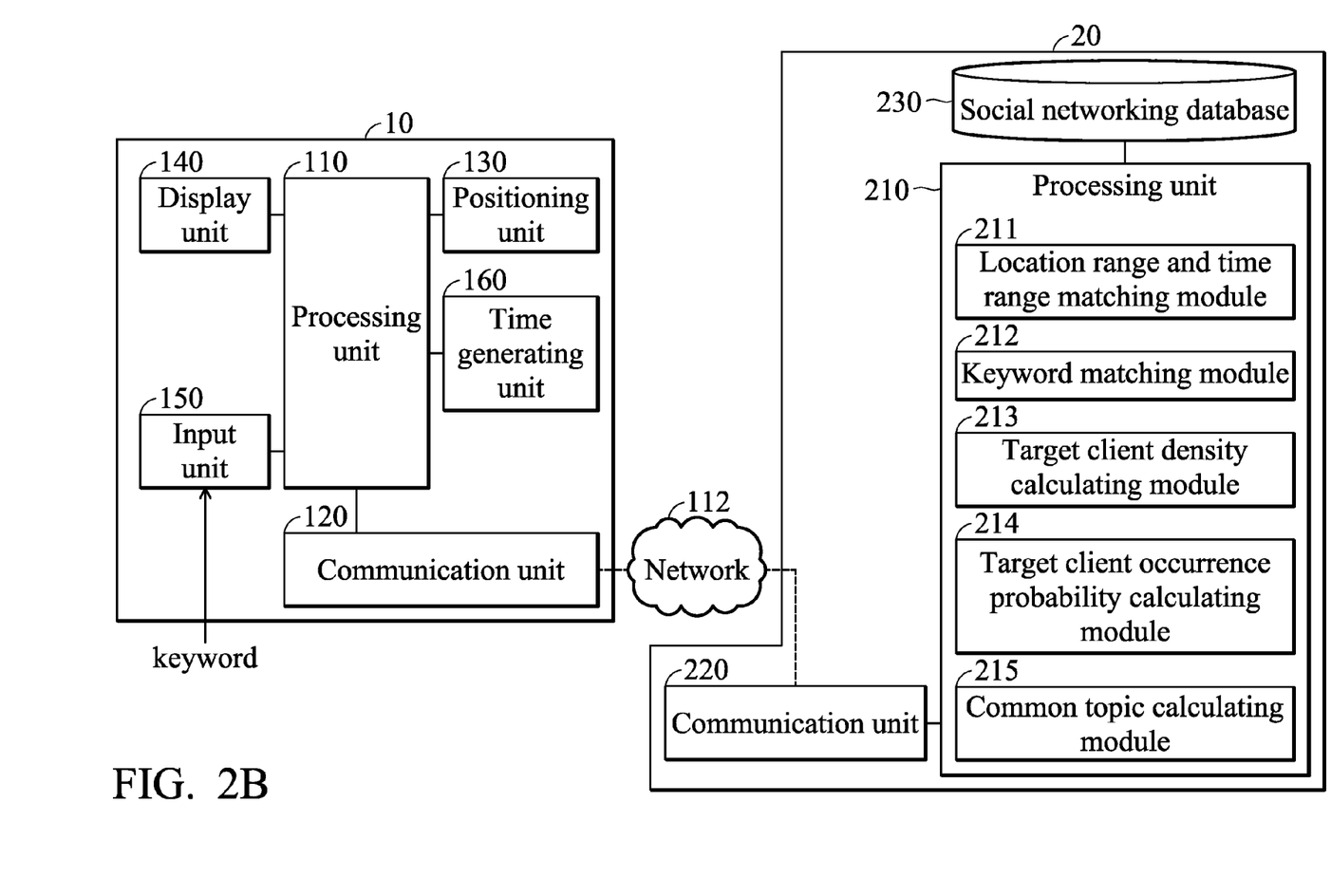
FIG. 2B is a block diagram of a system for searching target clients according to an embodiment of the invention.

FIG. 2B is a block diagram of a system for searching target clients according to an embodiment of the invention. The system comprises the device (user end) 10 for searching target clients and the server end 20. The user end 10 is the same as that in FIG. 2A, and thus details will not be described again. The server end, such as a computer, comprises a processing unit 210, a communication unit 220 and a social networks database 230. The processing unit 210 is connected to the communication unit 220 and the social networks database 230. The processing unit 210 further comprises a location range and time range matching module 211, a keyword matching module 212, a target clients density calculating module 213, a target clients occurrence probability calculating module 214 and a common topic calculating module 215.

The processing unit 210 of the server end 20 receives the target clients search message transmitted by the user end 10 through the communication unit 220. After receiving the target clients search message, the processing unit 210 obtains the at least one keyword, the target location and the target time from the target clients search message and starts to calculates the search result. Then the search result is transmitted to the user end 10 through the network 112.

The search result comprises at least one of the target clients amount, the target clients density and the target clients occurrence probability, corresponding to the at least one keyword, the target location and the target time. The location range and time range matching module 211 retrieves social networks data from the social networks database 230 according to a location range corresponding to the target location and a time range corresponding to the target time, wherein the retrieved social networks data corresponds to the location range and the time range. The location range and time range matching module 211 then takes users corresponding to the retrieved social networks data as potential clients, generates a potential clients list including the potential clients and counts the amount of the potential clients so as to obtain a potential clients amount. Afterwards, the keyword matching module 212 compares data corresponding to the potential clients in the at least one social networks data with the at least one keyword so as to retrieve target clients corresponding to the at least one keyword from the potential clients and generate a target clients list including the target clients. Then the keyword matching module 212 counts the amount of the target clients so as to obtain the target clients amount. In the embodiment, the keyword itself can be taken as the basic string for the comparison. Furthermore, an expansion of the keyword can also be used for the comparison. The target clients density calculating module 213 calculates the target clients density according to the target clients amount and the potential clients amount. The target clients density calculating module 213 may calculate the target clients density according to the following equation:

$$D = \frac{N_T}{N_P},$$

wherein D is the target clients density, $N_T$ is the target clients amount, and $N_P$ is the potential clients amount.

The target clients occurrence probability calculating module 214 calculates the target clients occurrence probability according to data corresponding to all the target clients in the social networks data, the location range and the time range. The target clients occurrence probability calculating module 214 may calculate the target clients occurrence probability according to the following equation:

$$P = \frac{\sum_{i=1}^{N_T} \frac{N(i, t, l)}{N(i, t)}}{N_T},$$

wherein P is the target clients occurrence probability, $N_T$ is the target clients amount, N (i, t, l) is the amount of social networks data corresponding to a target client i of the target clients and within a time range t and a location range l, N (i, t) is the amount of social networks data corresponding to the target client i and within the time range t.

In addition, the search result may further comprise a common topic of the target clients. The common topic calculating module 215 uses the topic detection to calculate the common topic of all the target clients according to data corresponding to all the target clients in the social networks data. The processing unit 210 transmits the common topic to the processing unit 110 through the communication unit 220, the network 112 and the communication unit 120, thereby the display unit 140 displays the common topic. The display unit 140 may directly display the common topic or display the map combined with the common topic. Furthermore, the search result may further comprise contact information of some target clients that are willing to provide their contact information in public in the target clients list. The processing unit transmits the contact information to the processing unit 110 through the communication unit 220, the network 112 and the communication unit 120, thereby the display unit 140 displays the contact information. The display unit 140 may directly display the contact information or display the map combined with the contact information.

Note that the amount of the user end 10 in FIG. 2A and FIG. 2B are only exemplary, and the invention is not limited thereto. For example, two or more than two user ends 10 can be connected to the server end 20 through networks.

Methods and systems of the present disclosure, or certain aspects or portions of embodiments thereof, may take the form of a program code (i.e., instructions) embodied in media, such as floppy diskettes, CD-ROMS, hard drives, firmware, or any other non-transitory machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

For example, each one of the steps described above may take the form of a program code stored in a memory or a storage device of a smart phone. When the program codes are executed in the smart phone according to the initiation of the user (such as touching a corresponding icon on the touch screen of the smart phone), the smart phone loads and executes the program codes and then performs the method for searching target clients as described above.

In another embodiment, the program codes of the steps of the method for searching target clients as described above can be separated into two parts which are stored into the smart phone and a server, respectively. The smart phone and the server load and execute their respective program codes to cooperatively perform all the steps of the method for searching target clients.

In still another embodiment, program codes described in the following are stored in a recording media. Then the program codes stored in the recording media are loaded and then executed by an electronic device (such as a computer, a server, a smart phone, and so on), the electronic device can obtains at least one keyword, a target location and a target time from another electronic device or from an input unit, a positioning unit and a time generating unit of the electronic device. The program codes stored in the recording media comprise: a first program code for generating a target clients search message according to the at least one keyword, the target position and the target time, and generating a search result according to the target clients search message, wherein the search result comprises at least one of a target clients amount, a target clients density and a target clients occurrence probability, which are retrieved from at least one social networks data and corresponding to the at least one keyword, the target location and the target time; and a second program code for displaying a map combined with the search result.

According to the method for searching target clients described above, the user can choose a region where he/she is going to promote or advertise products according to the target clients amount, the target clients density and the target clients occurrence probability. The user can further adaptively adjust ways to promote or advertise products according to the common topic. Therefore, promotion and advertising can be performed in a more efficient and beneficial way.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for searching target clients, applied to a mobile device coupled to a network, comprising:
inputting at least one keyword;
generating a target position by a positioning unit of the mobile device;
generating a target time by a time generating unit of the mobile device;
generating a target clients search message according to the at least one keyword, the target position and the target time, and transmitting the target clients search message to a server coupled to the network through the network;

receiving a search result transmitted by the server through the network, wherein the search result comprises at least one of a target clients amount, a target clients density and a target clients occurrence probability, which are retrieved from at least one social networks data and corresponding to the at least one keyword, the target position and the target time;

displaying a map combined with the search result;

retrieving, by the server, a plurality of potential clients corresponding to a location range and a time range from the at least one social networks data according to the location range and the time range and counting an amount of the plurality of potential clients to obtain a potential clients amount, wherein the target position is included in the location range and the target time is included in the time range;

comparing, by the server, data corresponding to the plurality of potential clients in the at least one social networks data with the at least one keyword, retrieving a plurality of target clients corresponding to the at least one keyword and calculating an amount of the retrieved target clients to obtain the target clients amount;

calculating, by the server, the target clients density according to the target clients amount and the potential clients amount;

calculating, by the server, the target clients occurrence probability according to data corresponding to the plurality of target clients in the at least one social networks data, the time range and the location range; and providing the target clients, the calculated target clients density and the calculated target clients occurrence probability.

2. The method as claimed in claim 1, wherein the server retrieves a common topic according to the data corresponding to the plurality of target clients in the at least one social networks data and transmits the common topic to the mobile device through the network, and the method further comprises:

displaying the common topic.

3. The method as claimed in claim 1, wherein the search result further comprises contact information of some of the plurality of target clients who are willing to provide their contact information, and the method further comprises:

displaying the contact information.

4. The method as claimed in claim 1, wherein the target clients density is calculated according the following equation:

$$D = \frac{N_T}{N_P},$$

wherein D is the target clients density, $N_T$ is the target clients amount, and $N_P$ is the potential clients amount.

5. The method as claimed in claim 1, wherein the target clients occurrence probability is calculated according the following equation:

$$P = \frac{\sum_{i=1}^{N_T} \frac{N(i, t, l)}{N(i, t)}}{N_T},$$

wherein P is the target clients occurrence probability, $N_T$ is the target clients amount, N (i, t, l) is an amount of social networks data, which corresponds to a target client i of the target clients, a time range t and a location range l, in the at least one social networks data, and N (i, t) is an amount of social networks data, which corresponds to the target clients i and the time range t, in the at least one social networks data.

6. A device for searching target clients comprising:

a communication unit, coupled to a network;

an input unit, where at least one keyword is input;

a positioning unit, generating a target position;

a time generating unit, generating a target time;

a processing unit, coupled to the communication unit, the input unit, the positioning unit and the time generating unit, generating a target clients search message according to the at least one keyword, the target position and the target time, transmitting the target clients search message to a server through the communication unit, and receiving a search result transmitted by the server through the communication unit, wherein the search result comprises at least one of a target clients amount, a target clients density and a target clients occurrence probability, which are retrieved from at least one social networks data and corresponding to the at least one keyword, the target position and the target time;

a display unit, coupled to the processing unit and displaying a map combined with the search result;

wherein the server is coupled to the network and at least comprises:

a database, storing the at least one social networks data; and a server processing unit, coupled to the database and receiving the target clients search message transmitted by the device, comprising:

a location range and time range matching module, retrieving a plurality of potential clients corresponding to a location range and a time range from at least one social networks data according to the location range and the time range and counting an amount of the plurality of potential clients to obtain a potential clients amount, wherein the target position is included in the location range and the target time is included in the time range;

a keyword matching module, comparing data corresponding to the plurality of potential clients in the at least one social networks data with the at least one keyword, retrieving a plurality of target clients corresponding to the at least one keyword and calculating an amount of the retrieved target clients to obtain the target clients amount;

a target clients density calculating module, calculating the target clients density according to the target clients amount and the potential clients amount; and a target clients occurrence probability calculating module, calculating the target clients occurrence probability according to data corresponding to the plurality of target clients in the at least one social networks data, the time range and the location range, wherein the server processing unit provides the target clients, the calculated target clients density and the calculated target clients occurrence probability.

7. The device as claimed in claim 6, wherein the search result further comprises a common topic, and the server processing unit further comprises:

a common topic calculating module, retrieving the common topic according to the data corresponding to the plurality of target clients in the at least one social networks data,
wherein the display unit further displays the common topic.

8. The device as claimed in claim 6, wherein the search result further comprises contact information of some of the plurality of target clients who are willing to provide their contact information, and the display unit further displays the contact information.

9. The device as claimed in claim 6, wherein the target clients density is calculated by the target clients density calculating module according the following equation:

$$D = \frac{N_T}{N_P},$$

wherein D is the target clients density, $N_T$ is the target clients amount, and $N_P$ is the potential clients amount.

10. The device as claimed in claim 6, wherein the target clients occurrence probability is calculated by the target clients occurrence probability calculating module according the following equation:

$$P = \frac{\sum_{i=1}^{N_T} \frac{N(i, t, l)}{N(i, t)}}{N_T},$$

wherein P is the target clients occurrence probability, $N_T$ is the target clients amount, N (i, t, l) is an amount of social networks data, which corresponds to a target client i of the target clients, a time range t and a location range l, in the at least one social networks data, and N (i, t) is an amount of social networks data, which corresponds to the target client i and the time range t, in the at least one social networks data.

* * * * *